March 17, 1953　　B. CARPENTER　　2,632,135
AUTOMATIC INSTRUMENT LANDING SYSTEM FOR AIR-BORNE CRAFT
Filed Sept. 15, 1948　　2 SHEETS—SHEET 1
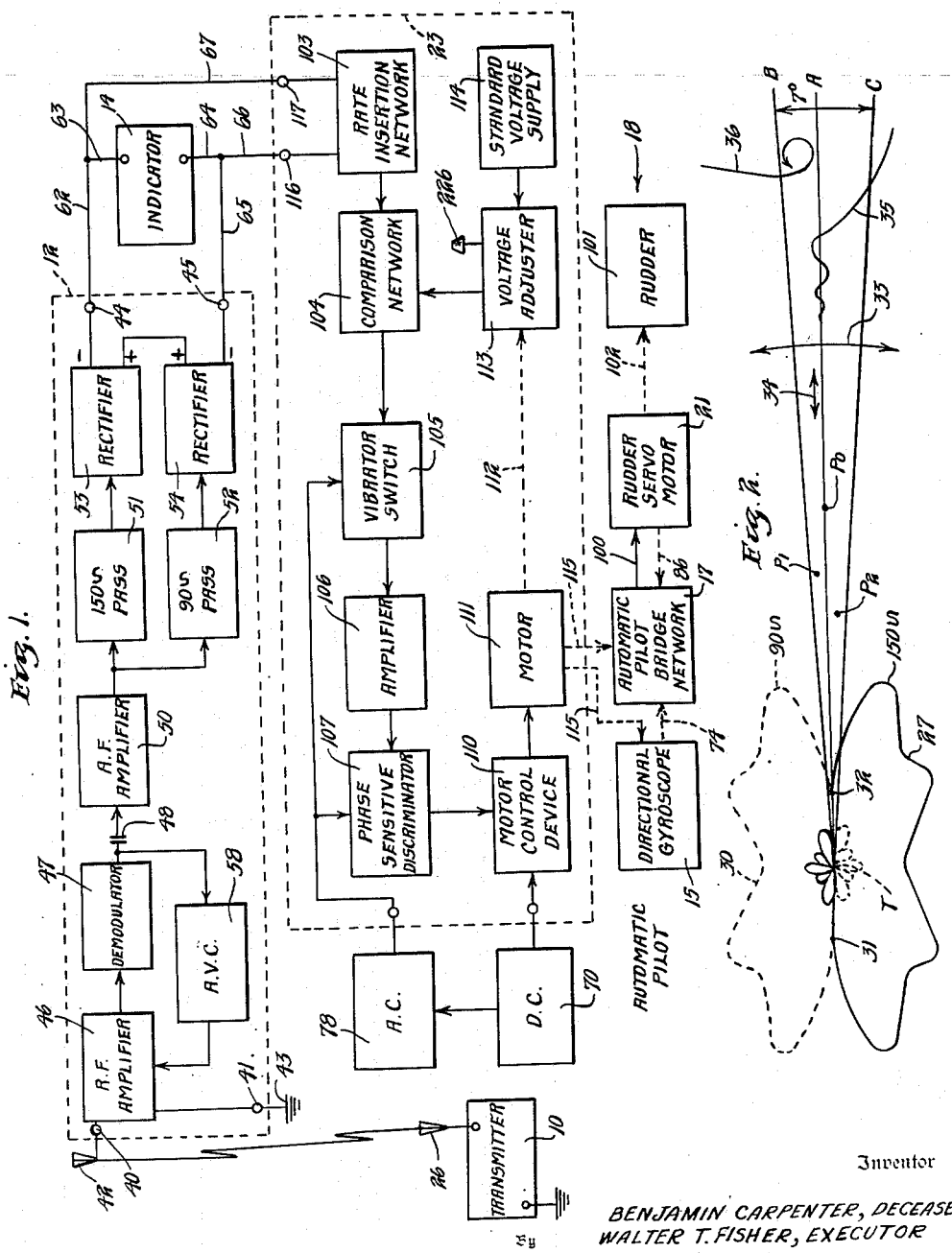
Inventor
BENJAMIN CARPENTER, DECEASED
WALTER T. FISHER, EXECUTOR
BY George H. Fisher
Attorney

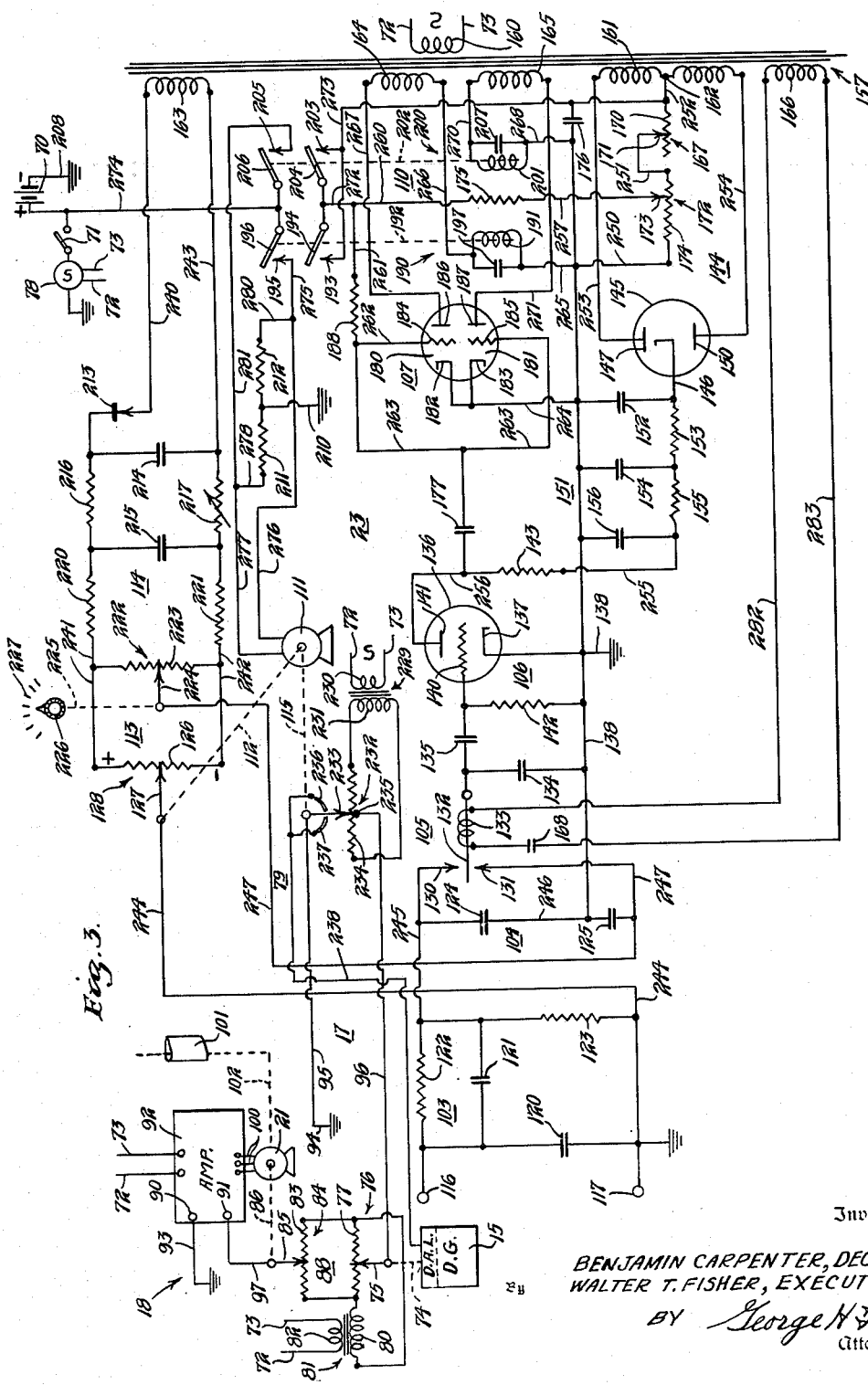

Patented Mar. 17, 1953

2,632,135

UNITED STATES PATENT OFFICE 2,632,135

AUTOMATIC INSTRUMENT LANDING SYSTEM FOR AIR-BORNE CRAFT

Benjamin Carpenter, deceased, late of Lake Forest, Ill., by Walter T. Fisher, executor, Chicago, Ill., assignor to Minneapolis-Honeywell Regulator Company, Minneapolis, Minn., a corporation of Delaware Application September 15, 1948, Serial No. 49,441

13 Claims. (Cl. 318—16)

This invention relates to the field of aviation, and more particularly to instrument systems designed to make it possible for air-borne craft to land safely regardless of reduced visibility at the destination. The system includes an automatic pilot, a blind landing instrument for detecting departure of the craft from a predetermined path and coupling means for bringing about operation of the former under the control of the latter.

A clear disclosure of an automatic pilot for air-borne craft is to be found in the November 1944 issue of "Electrical Engineering," beginning at page 849 of volume 63 of that publication. The principles and characteristics of the instruments making up a blind landing system are discussed in Technical Development Reports Numbers 35 and 36 of the Civil Aeronautics Administration, entitled "The CAA-RTCA Instrument Landing System" and published in October 1943. Up to the present, however, no satisfactory means have been provided by which the blind landing receiver, which has always operated simply as an indicator, is enabled to exercise control over an automatic pilot so that such changes in the control surfaces of the craft as may be required to cause the craft to follow a desired landing path are automatically brought about by the blind landing instrument without the intervention of a human intermediary. The present invention is designed to accomplish this.

It is an object of the invention to provide improved means for automatically controlling the course of a craft so that it follows a predetermined path over the surface of the earth.

It is another object of the invention to provide an improvement in such devices, in which the signal controlling the course of the craft in accordance with its departure from the predetermined path is not influenced by the length of the interval during which the craft has remained displaced from the path.

A further object of the invention is to provide improved means for operating an automatic pilot, designed for energization with alternating voltage, according to the signal from a blind landing system having a unidirectional voltage output, so that the craft follows the instrument approach path.

It is a further object of the invention to provide such a coupler in which the unidirectional voltage from the blind landing system is variably opposed by a unidirectional voltage from an independent source, any discrepancy between the two actuating a motor to alter the latter voltage so that the discrepancy will become zero, and simultaneously to readjust the automatic pilot to change the heading of the craft.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which are illustrated and described certain preferred embodiments of the invention.

For the sake of clarity of disclosure the present invention is shown as applied about the azimuth axis of the craft, to produce flat or skidding turns. It will of course be obvious that such duplication of equipment as is necessary to provide further control about the pitch axis of the craft, or indeed about all three axes, is a part of the present inventive concept, and is embraced in the appended claims. In the drawing, Figure 1 is a functional diagram of the complete system;

Figure 2 illustrates in plan the field in space set up by the complex electromagnetic radiation emitted by the transmitter of the blind landing instrument; and Figure 3 is a detailed wiring diagram showing the elements used in an actual embodiment of the coupler shown functionally in Figure 1.

General nature of the system

For an overall understanding of the invention, reference should now be made to Figure 1, in which the radio transmitter 10, located in the lower left hand portion of the figure, comprises the ground installation of the blind landing system; all the remaining elements shown in Figure 1 are air-borne. The air-borne components include a radio receiver 12 and an indicator 14, which are the usual air-borne components of the blind landing system.

In the lower portion of the figure there is disclosed an automatic pilot 18 in which a directional gyroscope 15 acts as a standard of azimuth and provides a signal indicating departure of the heading of the craft, from that desired, through the automatic pilot bridge network indicated generally at 17. This network energizes a rudder servomotor 21 whose operation is effective not only to bring about change in the heading of the craft by operating the appropriate control surface, such as rudder 101, but also to rebalance the appropriate bridge network in the automatic pilot. It should here be emphasized that the word "attitude" is used by those skilled in the art both in a restricted sense related only to the roll and pitch axes of a craft and in a broader sense related to the turn axis of the craft as well as to its roll and pitch axes.

There is also shown in Figure 1 a coupling unit 23 which functions to enable the bridge network shown at 17 to be influenced, in a fashion which may be correlated with the performance of the particular craft, by the output of the radio receiver 12. Before giving a detailed description of the coupling unit and its relationship to the other instruments, it appears desirable to give a little more fully the theory of operation of the blind landing system and that of the automatic pilot; the combination of these units in a single operative system is new, and this new combination cannot be perfectly understood without at least a general knowledge of the underlying theory.

Theory of landing path projection

The radio transmitter indicator generally outlined at 10 in Figure 1 energizes a complex antenna system 26 to project in space a pair of overlapping fields, one of a carrier frequency modulated at 150 cycles per second, and the other of the same carrier frequency modulated at 90 cycles per second, as shown by solid curve 27 and broken curve 30 respectively in Figure 2. In that figure it will be seen that there are two points, 31 and 32, at which the strengths of the two fields are equal. At either of these two points a ratio meter responsive to the two field strengths gives a "zero" or one-to-one indication.

Figure 2 is laid out to show the curves for a particular value of field strength, since of course the strength of the field radiated by an antenna is at every point determined by the distance between the antenna and that point. Regardless of what particular value of field strength may be chosen for illustrative purposes, the diagram itself will take the general form shown in Figure 2, the lobes being of larger area for a smaller value of field strength and of a smaller area for a larger value of field strength, and varying in specific outline with the arrangement of antenna elements and so on. For any value of field strength and any specific equipotential outlines, however, the points of intersection of the two equipotential fields lie on a straight line joining points 31 and 32 and passing through the transmitter T, which line has been indicated in the figure by the reference characters TA.

At any point on the line TA a ratio meter responsive to field strength indicates zero, as stated above. As the meter is moved normal to the line TA, in a downward direction, for example, the ratio meter no longer gives a zero indication, but shows an increase in the signal modulated at 150 cycles over the signal modulated at 90 cycles, and this increase in ratio continues until the maximum reading of the meter has been reached. Likewise, if the ratio meter moves normal to the line TA in an upward direction, the indication departs from zero in a direction which shows a predominance of the signal modulated at 90 cycles over that modulated at 150 cycles, and this too continues until an opposite maximum reading of the instrument has been obtained.

It has been found that one embodiment of this system works most satisfactorily when the sensitivity of the meter is so adjusted that its needle moves from its one-to-one ratio indication to its maximum ratio indication when the craft carrying it has deviated in either direction from the line TA by an amount measured by an angle of 3½ degrees at T: the lines TB and TC indicate the portion of space, about the central path, within which meter 14 is capable of giving a quantitative indication of the amount of departure of the craft from the desired path.

In theory the indication of the meter is strictly proportional to its displacement from the line TA only as the displacement takes place along the arc of a circle about T as a center, as indicated by the arrow 33 in Figure 2. Any component in the direction of the transmitter, as indicated by arrow 34, results in change in the strengths of both the 90-cycle modulated carrier and the 150 cycle modulated carrier, and these changes may not be strictly in proportion to the displacement of the instrument from the transmitted. To eliminate this possible variable, the receiver 12 includes an automatic volume control circuit which maintains the output of the receiver constant regardless of change in the distance between the instrument and the transmitter. The ratio of the strengths of the two carriers is of course not affected.

It must be realized that the instrument is not concerned with the heading of the craft, but only with its location. Anywhere within the triangle ATC, the instrument indicates that the craft should be turned to the right, so that the normal course of an approaching craft entering the "beam" from transmitter T, and following the signal of the blind landing instrument without modification, has a pattern indicated by the irregular curve 35.

The instrument is actuated by the pilot when the craft is about to enter the beam, and the meter needle swings to one of its stops. As the craft crosses the line TC, for example, and enters the beam, the needle moves away from its stop, but still indicates that a turn to the right is needed, and this continues until the craft crosses the line TA, at which time, the needle has its center zero position indicating a one-to-one ratio. The heading of the craft meanwhile has been changed to the right, however, turning it away from its desired course rather than toward it, so that it continues across the line TA and into the area ATB. Here the instrument indicates the need for a turn to the left, increasing in magnitude as the motion of the craft carries it further from the line TA. The heading of the craft is changed in response to the indication of the instrument, and it crosses the line TA again, this time at a more acute angle: eventually the craft takes the direction AT and holds it. The human pilot ordinarily anticipates the instrument, reducing his control surface displacement as the instrument indication decreases and thus sharply damping the course oscillation about TA.

There is one complication which must be considered. If an approaching craft enters the beam as indicated by the line 36, the indication given as the line TB is crossed is that the craft is to the right of the desired course and a turn to the left is therefore necessary. If the craft can turn sharply and is moving slowly, the turn may be executed so that the craft does not cross the line TA, as shown by the line 36; in such a case the instrument can never give an indication that a turn in the other direction is necessary and therefore causes the craft to continue to turn in a circle. A strong wind blowing across the beam toward the craft may have the same effect. A system to be foolproof must avoid this defect:

this is done according to the present invention in the following fashion.

When the craft is moving normal to the line TA in one direction the rate of change of the localizer receiver output is negative, regardless of which side of the line the craft is on, and similarly the rate is positive when the craft is moving in the opposite direction. The absolute magnitude of the localizer receiver output however is always positive when the craft is on one side of the line, and always negative when the craft is on the other side of the line. Whenever the craft is moving toward the center of the beam, the absolute magnitude and the rate of change of the localizer receiver output are of opposite polarity: if the craft is going away from the center of the beam, they are of the same polarity. The coupling unit includes means adding to the localizer output signal a second signal proportional to its rate of change, in the polarity relationship just recited. By judicious selection of components the relative magnitudes of the displacement and rate components of the modified signal may be adjusted so as to prevent circling as described above, since when the movement of the craft has a component away from the beam the rate component of the modified voltage increases the correction due to the displacement component. Likewise, the arrangement has antihunt properties, since when the movement of the craft has a component toward the beam the rate component of the modified voltage approaches a maximum value which opposes and may even exceed that due to the displacement component, and thus cause reverse operation of the controls.

As previously mentioned, the signal output of meter 14 simply shows that the craft is on one side or the other of the line TA, regardless of the heading of the craft. An approaching craft is proceeding in a general direction toward the transmitter, and if it is below the line TA as seen in Figure 2, a turn to the right is needed to return it to the beam. A departing craft at the same location is proceeding generally away from the transmitter, and in this case a turn to the left is required. It will thus be apparent that in case it is desired to practice the invention for departing as well as arriving craft, reversing means must be provided to take care of this contingency.

The structure of receiver 12 will now be described in some detail, since use is made in this invention of the output from the receiver and somewhat more specific knowledge of the function of this unit will assist in understanding the invention. For this more specific information reference should once more be made to Figure 1.

*Receiver construction and operation*

In Figure 1 radio receiver 12 is shown to comprise a pair of input terminals 40 and 41, to which are connected the receiving antenna 42 and a ground connection 43, respectively, and a pair of output terminals 44 and 45. A radio frequency amplifier 46 of a suitable number of stages is connected to input terminals 40 and 41, and the output of the radio frequency amplifier is fed through a demodulator 47 and a blocking condenser 48 to an audio frequency amplifier 50 which may also be of any suitable number of stages. While demodulator 47 is customarily a diode detector, any equivalent non-linear impedance means may be made use of to perform this function.

The output of the audio amplifier 50 is divided and impressed upon a pair of filter circuits, of which that indicated by reference numeral 51 is adjusted to have a low impedance to alternating voltages whose frequency is in the neighborhood of 150 cycles per second, while presenting a high impedance to alternating voltages having a frequency of 90 cycles per second. Similarly, filter 52 is adjusted to have a low impedance to alternating voltages having a frequency of 90 cycles per second, and a high impedance to alternating voltages having a frequency of 150 cycles per second. By this means the output of audio frequency amplifier 50 is divided into two components whose relative magnitudes are substantially proportional to those of the 90- and 150-cycle components of the radiation received by antenna 42. The output of filter 51 is passed through a rectifier 53 which may also include means producing any desired degree of D. C. smoothing, and the output of filter 52 is passed through a rectifier 54 which may also be provided with suitable smoothing means, so that the outputs of rectifiers 53 and 54 are essentially unidirectional voltages. The rectifiers are connected in series so that their voltages oppose one another, and this series circuit is connected to output terminals 44, 45 of the radio receiver.

An automatic volume control 58 is also provided, as discussed above, to maintain the output from the radio frequency amplifier at a substantially constant level regardless of fading or of movement of the craft toward or away from the transmitter.

The radio receiver operates as follows, it being first assumed that the craft is located somewhere on the equi-signal line TA of Figure 2, as at P₀. The radiations from the transmitter 10 are picked up by antenna 42 in equal magnitude and impressed upon radio frequency amplifier 46, amplified, and fed to demodulator 47 where the carrier is removed. The unidirectional component of the demodulator output is fed through the automatic volume control circuit 58 and back to bias the radio frequency amplifier so as to stabilize this output regardless of change in the distance between the craft and the transmitter. The alternating component of the demodulator output, comprising 90 and 150 cycle components of equal magnitude, is impressed on the audio frequency amplifier 50, its magnitude being independent of the distance from the craft to the transmitter because of the automatic volume control circuit. The audio frequency amplifier is effective equally on the 90 and 150 cycle components of the demodulated carrier, so that the relative magnitudes of these voltages are the same after amplification as they were before, and a complex audio voltage having equal 90 and 150 cycle components is impressed on the inputs of filters 51 and 52.

Because of their electrical nature, filters 51 and 52 present equal, comparatively high impedances to frequencies of 90 and 150 cycles, and equal, comparatively low impedances to frequencies of 150 and 90 cycles, both respectively; this results in the application to rectifiers 53 and 54, respectively of alternating voltages essentially of only 150 or 90 cycles, and of equal amplitude. Rectifiers 53 and 54 are designed to give equal unidirectional output voltages when energized in this fashion, the polarity of these output voltages being as shown in Figure 1. Since the two outputs are connected in series to oppose one another, it is evident that because of their equality no resultant output voltage can appear at the output terminals of their receiver.

If the craft is located at some point not on the equisignal line TA, such as point P₁, the radiations from the two transmitters do not reach antenna 42 in equal magnitude, that modulated at 90 cycles exceeding that modulated at 150 cycles. The ratio between the strengths of the radiations is unaffected in the radio frequency amplifier, the demodulator, and the audio frequency amplifier, whose output is a complex audio wave having unequal 90 and 150 cycle components, the former exceeding the latter. The voltage output from filter 52 therefore exceeds that from filter 51, and accordingly the unidirectional output of the rectifier 54 exceeds that of rectifier 53, and a voltage appears across terminals 44 and 45 of receiver 12, terminal 44 being positive and terminal 45 being negative.

If the craft is located at point P₂ rather than at P₁, the radiation modulated at 150 cycles reaching antenna 42 exceeds that modulated at 90 cycles. The receiver operates in a fashion similar to that just described, but this time the unidirectional voltage output from rectifier 53 exceeds that from rectifier 54, and the voltage appearing across terminals 44 and 45 of receiver 12 is now of the opposite polarity, terminal 45 being positive and terminal 44 being negative.

The output from receiver 12 is connected to indicator 14. This indicator comprises in effect a voltmeter, the needle of which is displaced from a central position on energization of the winding with unidirectional voltage. If the energizing voltage is of a first polarity the needle is deflected to the left, while if the polarity of the energizing voltage is reversed, the deflection of the needle is also reversed. The indicator is energized from output terminals 44 and 45 of the radio receiver 12 by conductors 62, 63, 64 and 65, so that when terminal 44 of the receiver is positive the needle is deflected to the left.

It will be seen that the structure thus far described in connection with Figure 1 is simply that of an indicating instrument for pointing out visually to the human pilot of a craft that the center of the path projected in space by transmitter 10 and perceived by receiver 12 is to the right or to the left of the position of the craft. Such a device, while of great utility to human pilots in the control of craft particularly during overcast weather conditions, is without utility for automatically controlling the movement of a craft, since it requires the presence of a human intermediary. This invention, as previously pointed out, centers about the coupling unit 23 by which the voltage output of the radio receiver, normally used to perform simply an indicating function, is adapted to perform a control function. To this end the output of radio receiver 12, in addition to its connection to indicator 14, is connected to coupling unit 23 by conductors 62, 67, 66 and 65. Before describing in detail the structure of coupling unit 23, however, it appears desirable to describe such features of the structure and operation of the automatic pilot as are necessary to an understanding of the system as a whole. For this purpose reference should now be made to Figures 1 and 3.

*Structure and operation of the automatic pilot*

The usual source of electrical energy in any aircraft is a 28 volt storage battery charged by a generator driven by the engine. Such a battery is indicated at 70 in the upper right hand portion of Figure 3, and is shown as energizing, through a switch 71, an inverter 78 which supplies alternating electrical energy for the various amplifiers, motors, and bridge transformers comprising the automatic pilot through a pair of conductors 72 and 73, and which indeed may be large enough to provide all the alternating voltage for the aircraft, just as the battery 70 may provide all the unidirectional voltage.

In the automatic pilot the directional gyroscope 15 acts through a "directional arm" or mechanical connection 74 to stabilize the position of the slider 75 of a potential divider 76 whose winding 77 is rigid with the craft and therefore moves with it with respect to stabilized wiper 75. The secondary winding 80 of a transformer 81, whose primary winding 82 is energized with alternating voltage through conductors 72 and 73, is connected to the terminals of winding 77 of potential divider 76, and also to the terminals of the winding 83 of a potential divider 84, the wiper 85 of which is mechanically connected as by means 86 to the shaft of rudder servomotor 21. Winding 83 is fixed with respect to slider 85 so that operation of servomotor 21 is effective to vary the position of slider 85 on winding 83.

It will be seen that the structure just recited comprises a normally energized Wheatstone bridge 88 whose input terminals are the terminals of secondary winding 80 of transformer 81, and whose output terminals are the sliders 75 and 85 of potential dividers 76 and 84. If the heading of the craft departs from that desired, winding 77 moves with respect to slider 75, effecting an unbalance of bridge 88, which will be referred to as the rudder bridge: the unbalance voltage is impressed upon the input terminals 90 and 91 of a normally energized amplifier 92 through means including a pair of conductors 95 and 96 which are normally electrically connected together as will presently be described. It will of course be realized that bridge 88 is shown in its most elementary form and that in actual practice refinements of the structure are found advantageous to obtain maximum satisfaction from the device. These, however, do not change the basic operation of the system, which is as here described.

Amplifier 92 is of a well known type and energizes motor 21 through conductors 100 for operation in a first direction when the amplifier input is energized with alternating voltage of a first phase, and for operation in the opposite direction when it is energized with alternating voltage of the opposite phase, as compared to the phase of the voltage supplied to the power terminals of the amplifier: in each case the motor is energized for operation in such a direction that the resulting motion of slider 85 acts to rebalance bridge 88 and therefore to remove the input signal upon the amplifier, whereupon operation of the motor ceases. Operation of motor 21 is also effective to change the position of the rudder 101 of the craft by a suitable mechanical connection 102. As the craft resumes its normal heading winding 77 is brought back to its normal relation to the position of slider 75 and this unbalances the bridge in the opposite sense, to return the rudder to its normal position, and also to recenter wiper 85, by operation of motor 21.

From the above it will be apparent that the function of this portion of the automatic pilot is to correct any departure of the heading of the craft from a particular one determined by the setting of the directional gyroscope 15. For a practical automatic pilot steering means must also be provided for varying the heading of the directional gyroscope, and a disclosure of structure suitable for this purpose is to be found in application Ser. No. 447,989 of Willis H. Gille, filed June 22, 1942, and assigned to the assignee of the present invention.

The Gille application also discloses means for locking the directional arm of the directional gyroscope to the gyroscope housing, since under certain conditions the bridge network must not be subject to alteration by the gyroscope. Suitable frictional connecting means between the directional gyroscope and the directional arm allow relative slipping to take place when the arm is locked. Such a directional arm lock must be made a part of the present system, and is considered as forming a part of the directional gyroscope 15, to lock directional arm 74 so as to prevent relative movement between slider 75 and winding 77 from taking place, and as being energized in the fashion disclosed in the Gille application. Independently operative means 79 are also provided for energizing the directional arm lock upon operation of coupling unit 23, as will presently be described.

Since the structural details of the steering means and the directional arm lock per se are fully disclosed in the copending application referred to, they will be given no further mention in the present application.

The foregoing brief description of the automatic pilot should make its construction and operation sufficiently apparent for the purpose of understanding the present invention. A study of Figure 3 will make it at once evident that the application of an additional voltage between conductors 95 and 96 is sufficient to energize amplifier 92 independently of any previous unbalance of bridge 88. The additional voltage may be balanced out by suitable opposite unbalancing of the bridge to give a resultant zero signal to the amplifier, if the independent voltage is of the same frequency as that supplied by the bridge transformer secondary winding, and of proper phase relationship. The coupling unit 23 of the present invention is designed to provide such a voltage to control the operation of the rudder servomotor independently of and in addition to the control by the directional gyroscope, in accordance with signals supplied by the blind landing receiver as the craft follows or departs from the path in space electromagnetically projected by the radio transmitter of the automatic approach system.

*Function of the coupling unit*

Coupling unit 23 is illustrated in complete detail in Figure 3, but will probably be more easily understood if reference is first made to Figure 1 which includes a simplified functional diagram of the components making up the coupler.

The unidirectional voltage from receiver 12 is fed through a rate insertion network 103 which is not effective so long as the signal is of constant magnitude, but which acts, when the signal varies in magnitude, to oppose the variation. The output of the rate insertion circuit is fed through a comparison network 104 presently to be described to a vibrator switch 105, which is maintained in operation by energy from a suitable source of alternating voltage 78. The level of the square wave output from vibrator switch 105 is raised in amplifier 106, and the output of the amplifier is impressed upon a phase sensitive discriminator 107 which is energized from the same source as, and therefore synchronously with, vibrator switch 105. Amplifier 106 and vibrator switch 105 together make up what is often called a "D. C." amplifier. The output of the discriminator is in turn made use of to energize a motor control device 110 which regulates the energization of a rebalancing motor 111 from a suitable source 70 of energizing voltage. Motor 111 acts through a mechanical connection 112 to adjust the voltage adjuster 113, whose function is to determine the relative proportion of a standard voltage 114 which is inserted into comparison network 104. Motor 111 acts through a further mechanical connection 115 to bring about an unbalance in the automatic pilot bridge network 17, energizing rudder servomotor 21 for reversible operation as previously described. The general outline of coupling unit 23 having been made clear, its detailed structure as shown in Figure 3 will now be considered.

*Detailed structure of the coupling unit*

As best shown in Figure 3, the blind landing signal is applied to coupling unit 23 at terminals 116 and 117, to which is connected rate insertion circuit 103 comprising a rate taking series circuit including a resistor 123 and a capacitor 121. A smoothing capacitor 120 is connected directly across terminals 116 and 117 and a further resistor 122 is included in rate insertion circuit 103 to provide a displacement component in the output of the circuit. After modification in the rate insertion circuit, the signal is impressed across the input resistor 123 of comparison network 104 which includes as further components a pair of equal capacitors 124 and 125 and a portion of voltage adjuster 113 comprising a potential divider 128 having a winding 126 and a slider 127 movable with respect thereto by means presently to be described. The output of comparison network 104 is interrupted in vibrator switch 105, which is shown to comprise a pair of fixed contacts 130 and 131, a movable contact 132, and an actuating winding 133. After interruption, the signal is impressed across a capacitor 134 to remove high frequency transients, and then applied by a coupling capacitor 135 to the grid 140 of a triode 136 which also includes a cathode 137 and an anode 141; cathode 137 of triode 136 is connected to a ground bus, as indicated at 138. Triode 136 is comprised in amplifier 106, and the input or grid resistance for this triode is indicated by the reference numeral 142. Anode potential for triode 136 is derived from a conventional power supply including a rectifier 144 and a filter 151: the plate resistor for triode 136 is indicated by the reference numeral 143.

Rectifier 144 is shown to comprise a full wave rectifier tube 145 having a cathode 146 and a pair of anodes 147 and 150. Filter 151, which is connected to the output of rectifier 144, is shown to be of the capacitance input, resistance-capacitance type, comprising capacitors 152, 154 and 156 and resistors 153 and 155, all connected in a conventional fashion. Anode voltage for rectifier 144 is derived from a secondary winding 161 of a transformer 157 having a primary winding 160 energized with alternating voltage through conductors 72 and 73 and a plurality of further secondary windings 163, 164, 165 and 166: winding 161 is center tapped as at 162. Winding 166 of transformer 157 provides energizing voltage for vibrator switch 105, through a phasing capacitor 168. The anode circuit of triode 136 includes ground bus 138 and a pair of variable resistors 167 and 172, the former being of the rheostat type comprising a winding 170 and a slider 171 and the latter being of the potential divider type and comprising a winding 174 and a slider 173. A smoothing capacitor 176 is connected in shunt with resistors 167 and 172.

The alternating component of the output of triode 136 is applied through coupling capacitor 177 to discriminator 107, as previously described. Discriminator 107 is shown to comprise a pair of triodes 180 and 181 having respectively cathodes 182 and 183, grids 184 and 185, and anodes 186 and 187. The anode circuit of triode 180 includes winding 164 of transformer 157 and the winding 191 of a relay 190 whose armature 192 actuates movable contacts 194 and 196 with respect to fixed contacts 193 and 195: a capacitor 197 is connected in shunt with winding 191. Similarly the anode circuit of triode 181 includes winding 165 of transformer 157 and the winding 201 of a relay 200 whose armature 202 actuates the movable contacts 204 and 206 with respect to fixed contacts 203 and 205; a capacitor 207 is connected in shunt with winding 201.

Cathodes 182 and 183 are connected together and to ground. Grids 184 and 185 are connected together and to coupling capacitor 177: the two grids have a common input resistance comprising fixed resistors 175 and 188 and a portion of winding 174. Completion of the electrical circuit between movable contact 194 and fixed contact 193 or between movable contact 204 and fixed contact 203 is effective to shunt the series circuit including the portion of winding 174 to the right of slider 173 and the portion of winding 170 to the right of slider 171 by a circuit including resistor 175, thus altering the grid bias on grids 184 and 185.

Movable contacts 196 and 206 are energized from the positive pole of battery 70, the negative pole of which is grounded as at 208. A pair of resistors 211 and 212 having a common terminal grounded as at 210 are connected to fixed contacts 205 and 195 respectively, and rebalancing motor 111 is connected across the series connection of resistors 211 and 212.

Standard voltage supply 114 may simply comprise a battery if this is desired, as is illustrated in Figure 1. However, in Figure 3 there is shown a more convenient arrangement in which the standard voltage derives its energy from transformer 157, and to comprise winding 163 of that transformer, a rectifier 213, and a two stage resistance-capacitance filter of the capacitor input type comprising capacitors 214 and 215 and resistors 216, 217, 220, and 221. The standard voltage supply is connected to voltage adjuster 113 which is shown to comprise potential divider 128 and a further potential divider 222 having a sliding contact 224 and a winding 223, the latter being connected in parallel with winding 126 of potential divider 128, to voltage supply 114. Slider 224 of potential divider 222 is actuated by a mechanical connection 225 to a manual knob 226 having an index which is displaceable with respect to a fixed scale 227. Slider 127 of potential divider 128 is movable by a mechanical link 112 to motor 111 as previously described.

As previously mentioned, motor 111 actuates means 115, which operates a slider 233, grounded as at 94 by conductor 95, with respect to the winding 234 of a potential divider 232. Winding 234 is continuously energized from the secondary winding 231 of a transformer 229 having a primary winding 230 energized from conductors 72 and 73. Actuation of slider 233 away from center tap 235 is also effective to complete a circuit between grounded wiper 233 and one or the other of a pair of contact segments 236 and 237 which control energization of the directional arm lock previously discussed. It should be noted that while transformer 229 must be energized from the same source as transformer 81, this is not necessarily true of transformer 157; the latter may be energized at any other frequency if desired.

*Circuit connections*

A number of electrical circuits of interest will now be traced. The upper terminals of the windings of voltage adjuster 113 are maintained positive with respect to the lower terminals of the windings through a D. C. circuit which may be traced from the upper terminal of transformer secondary 163 through conductor 240, rectifier 213, resistors 216 and 220, conductor 241, windings 126 and 223, conductor 242, resistors 221 and 217, and conductor 243 to the lower terminal of the secondary.

Voltage adjuster 113 is seen to comprise a Wheatstone bridge whose input terminals are conductors 241 and 242 and whose output terminals are sliders 127 and 224. So long as the sliders have the same relative positions on their windings, the bridge acts simply as a resistance between sliders 127 and 224. If slider 127 is further from its center in the direction of conductor 241 than is slider 224, the former has a positive potential with respect to the latter, while if slider 127 is further from its center in the direction of conductor 242 than is slider 224, the latter has a positive potential with respect to the former. This is true even if both sliders are displaced in the same direction from their central positions, so long as the displacements are unequal.

In the absence of input signal at terminals 116 and 117; slider 127 determines the potential of fixed contact 130 through a circuit which may be traced from slider 127 through conductor 244, resistor 123, conductor 245, to contact 130. Similarly slider 224 determines the potential of fixed contact 131 through a conductor 247. Capacitors 124 and 125, connected in series by conductor 246, are shunted across contacts 130 and 131: since their capacitances are equal the potential of conductor 246 is always midway between those of the fixed contacts. This conductor is grounded. The initial condition of this portion of the instrument is that in which no signal is applied to terminals 116 and 117, and sliders 127 and 224 are at the centers of their windings. In this initial condition fixed contacts 130 and 131 and conductor 246, which is connected to ground bus 138, are all at the same potential. If now a signal is applied to input terminals 116 and 117 in such a fashion that terminal 116 is positive with respect to the terminal 117, sliders 127 and 224 remaining as before, conductor 245 becomes positive with respect to conductor 247. Since no voltage is being supplied from the bridge of standard source 113, conductor 246 (and therefore the ground) is at a potential midway between them. When movable contact 132 engages fixed contact 130 it becomes positive with respect to ground, and when it engages fixed contact 131 it becomes negative with respect to ground. If the polarity of the incoming signal is reversed movable contact 132 becomes negative when it engages fixed contact 130 and positive when it engages fixed contact 131.

The DC anode circuit of triode 136 may be traced from anode 141 through the triode, cathode 137, ground bus 138, conductor 250, winding 174, conductor 251, slider 171, the portion of winding 170 to the right of the slider, conductor 252, center tap 162, winding 161, conductors 253 and 254, anodes 147 and 150 of rectifier tube 145, the tube, cathode 146, resistors 153 and 155, conductor 255, resistor 143, and conductor 256 back to the anode. A voltage drop takes place in windings 174 and 170 due to the anode current of triode 136, and a portion of this voltage determined by the position of slider 173 is connected to the grids of triodes 180 and 181 by conductor 257, resistor 175, conductors 260 and 261, resistor 188 and conductors 262 and 263, and to the cathodes of triodes 180 and 181 by conductor 250, ground bus 138 and conductor 264.

The anode circuit of triode 180 may be traced from anode 186 through the triode, cathode 182, conductor 264, ground bus 138, conductor 265, the parallel circuit comprising capacitor 197 and winding 191 of relay 192, conductor 266, winding 164 of transformer 157, conductor 267 back to the anode.

The anode circuit of triode 181 may be traced from anode 187 through the triode, cathode 183, conductor 264, ground bus 138, conductor 268, the parallel circuit including capacitor 207 and winding 201 of relay 202, conductor 270, winding 165 of transformer 157, and conductor 271 back to the anode.

Operation of either relay 190 or relay 200 completes a circuit from slider 173 through conductor 257, resistor 175, conductors 260 and 272, movable contact 194 or 204, fixed contact 193 or 203, and conductor 273 back to conductor 252: this serves to set slider 173 at the potential of center tap 162, the resistance of resistor 175 being sufficiently high to prevent the flow of appreciable current therethrough. By this means the negative bias on the grids of discriminator 107 is increased by a selected amount determined by the settings of sliders 171 and 173. If the output from amplifier 141 is considerable, this change in bias is not sufficient to cut off the discriminator, but if the output of amplifier 141 is not greater than output voltage on grids 184 and 185 by an amount equal to the change in bias, intermittent operation of motor 111 as the signal decreases results.

Operation of relay 192 completes a circuit from the positive pole of battery 70 through conductor 274, movable contact 196, fixed contact 195 and conductor 275 to a pair of parallel circuits, one including conductor 276, motor 111, conductors 277 and 278, resistor 211 and ground connection 210, and the other including conductor 280, resistor 212 and ground connection 210. Current flows from conductor 276 to conductor 277, causing operation of motor 111 in a first direction.

Operation of relay 202 completes a circuit from the positive pole of battery 70 through conductor 274, movable contact 206, fixed contact 205, and conductor 281 to a pair of parallel circuits, one including conductor 277, motor 211, conductors 276 and 280, resistor 212 and ground connection 210, and the other including conductor 278, resistor 211 and ground connection 210. Current flows from conductor 277 to conductor 276, causing operation of motor 111 in the opposite direction.

Winding 133 of vibrator switch 105 is energized from secondary winding 166 of transformer 157 through conductors 282 and 283 and phasing capacitor 168. Member 132 vibrates synchronously at the frequency of the applied voltage. The voltages on the anodes of triodes 180 and 181 and on the vibrator coil are all derived from windings on transformer 157, and are so phased that when blade 132 of vibrator 105 is engaged with fixed contact 130, the voltage on anode 186 is passing through a positive half cycle with respect to cathode 180 and the voltage on anode 187 is passing through a negative half cycle with respect to cathode 183. Half a cycle later in the period of the alternating voltage, movable contact 132 is engaged with fixed contact 131, the voltage on anode 186 is passing through a negative half cycle with respect to cathode 182, and that on anode 187 is passing through a positive half cycle with respect to cathode 183.

The input circuit for amplifier 92 may be traced from terminal 91 through conductor 97, slider 85, bridge 88, slider 75, conductor 96, center tap 235 of winding 234, slider 233, conductor 95, and ground connections 94 and 93 to terminal 90.

The circuit for the directional armlock may be traced from ground connection 94 through conductor 95, slider 233, segment 236 or segment 237, and conductor 238 to the directional arm lock, which completes the circuit to the positive pole of the battery as is taught in the Gille application previously mentioned.

Suitable values for the various components of one embodiment of the invention are as follows:

| Component | Value |
|---|---|
| Resistor 122 | 400,000 ohms. |
| Resistors 123 and 153 | 25,000 ohms. |
| Resistors 142, 143, and 175 | ¼ megohm. |
| Resistor 155 | 50,000 ohms. |
| Resistor 188 | ½ megohm. |
| Resistors 211 and 212 | 50 ohms. |
| Resistors 216, 220, and 221 | 10,000 ohms. |
| Variable resistor 167 | 10,000 ohms. |
| Variable resistor 217 | 60,000 ohms. |
| Potential divider 84 | 1,500 ohms. |
| Potential dividers 76, 128, and 222. | 500 ohms. |
| Potential divider 172 | 20,000 ohms. |
| Potential divider 232 | 2,000 ohms. |
| Capacitor 120 | 500 microfarads. |
| Capacitor 121 | 75 microfarads. |
| Capacitors 124, 125, 154, 156, 197 and 207. | 1 microfarad. |
| Capacitors 134 and 135 | .1 microfarad. |
| Capacitors 152 and 176 | .25 microfarad. |
| Capacitor 177 | .05 microfarad. |
| Capacitors 214 and 215 | 50 microfarads. |
| Battery 70 | 28 volts D. C. |
| Motor 111 | 12 volts D. C. |
| Inverter 78 | 19 volts, 105 cycles, 1 phase. |
| Vibrator 133 | 19 volts, 105 cycles, 1 phase. |
| Primary windings 82, 160, and | 19 volts, 105 cycles, 1 phase. |
| Secondary windings 80 and 231. | 30 volts. |
| Secondary winding 161 | 520 volts center tapped. |
| Secondary winding 163 | 3 volts. |
| Secondary windings 164 and 165. | 360 volts. |
| Secondary winding 166 | 19 volts. |
| Triodes 180 and 181 | 7N7. |
| Triode 136 | Half of a 7F7. |
| Rectifier 145 | 7Y4. |

Operation

The blind landing equipment is installed and adjusted in the regular fashion, so that when the receiving antenna is located on the line TA from the transmitter, no output signal is delivered at terminals 44 and 45 of the receiver. Practically this means a minimum signal, said actual zero output is very difficult to achieve commercially. The automatic pilot is set up so that when the craft has the desired heading as set into the directional gyroscope sliders 75 and 85 are at the centers of the respective windings, motor 21 is deenergized, and rudder 101 is in the desired streamline or trimming position. Slider 233 is brought to center tap 235, motor 111 is rendered temporarily inoperative by any suitable disconnect, locking, or other means not shown, and coupling unit 23 is energized with sliders 127 and 224 at their central positions. Any residual or zero signal output from the receiver is balanced by adjusting slider 224 manually so that as nearly as possible fixed contacts 130 and 131 are at the same potential, after which motor 111 is once more made operative.

The foregoing conditions assume that the craft is located on the line TA and that it has the selected heading. Now suppose the heading of the craft is changed to the left, as by a gust of wind. This means that winding 77 moves to the left with respect to slider 75, bridge 88 is unbalanced and motor 21 is energized for clockwise operation to move slider 85 to the right until the bridge is again balanced, at the same time acting through member 102 to displace the rudder in a direction to turn the craft to the right. As the craft turns, winding 77 moves to the right with respect to slider 75, unbalancing bridge 88 in the opposite sense and therefore energizing motor 21 for counterclockwise operation to return slider 85 toward its central position and to return rudder 101 toward the streamline position, which positions are reached when the craft has returned to its desired heading. If the craft deviates to the right of the desired heading, the same operation takes place, in the opposite sense.

Now suppose the craft is carried to the left of its proper path by the wind, although still maintaining the desired heading. A voltage appears between terminals 116 and 117, the former for example being positive, so that fixed contact 130 of vibrator switch 105 is positive and fixed contact 131 is negative.

During a first half cycle of the alternating voltage from inverter 78 grid 140 of triode 136 is positive, and during the next half cycle the grid is negative. An alternating voltage having a generally square wave shape is thus transmitted through and amplified in triode 136, its phase being reversed as it passes through the triode, as is well known. Thus during the first half cycle the grids of discriminator 107 are both negative. During the same half cycle anode 186 is positive and anode 187 is negative. Triode 181 cannot discharge because of its negative anode potential, and the negative signal on the grid of triode 180 in addition to the bias voltage prevents flow of sufficient anode current to that triode to operate relay 190.

During the second half cycle the grids of discriminator 107 are both positive. Triode 180 cannot discharge because of its negative anode potential, but triode 181 has a positive anode potential. This triode therefore discharges, the flow of anode current being sufficient to actuate relay 200.

As the first half cycle returns, the situation as regards the grid and plate voltages is as before. Relay 200 is sufficiently slow acting, however, due in part to the effect of capacitor 207, so that its circuit is not interrupted and when the second half cycle returns, the energy in the relay-capacitor system is again built up. The relay 200 remains continuously actuated if a large signal is being recessed. If the recessed signal is small, the charge in bias brought about by actuation of the relay is sufficient to reduce the relay current below the value necessary to hold it actuated, and it opens, changing the bias in the opposite direction and thus causing intermittent operation of the relay, which in turn reduces the rate of operation of the motor. In other words, as the condition of balance is approached the rate at which correction takes place is reduced, giving the system an anti-hunt tendency.

Thus for the condition of an input signal which makes terminal 116 positive, discriminator triode 181 discharges during recurring second half cycles of the alternating source, and relay 200 only remains actuated. If the polarity of the input signal is reversed, that is, if the craft is displaced from its desired path in the opposite direction, exactly the opposite happens: discriminator triode 180 discharges during recurring first half cycles of the alternating source, and relay 190 only remains actuated.

Operation of relay 200 energizes motor 111 to operate in a clockwise direction. This moves slider 127 downward along winding 126, and also moves slider 233 to the right. Downward movement of slider 127 makes conductor 244 negative with respect to conductor 247, and therefore with respect to fixed contact 131, because of the resulting unbalance of voltage adjuster 113. Conductor 245, and therefore fixed contact 130, are already positive with respect to conductor 244 because of the signal voltage across resistor 123: by proper adjustment of slider 127 the two fixed contacts may be brought to the same potential. This reduces the amplitude of the square wave on the grid of triode 136 to zero, removing the positive signal voltage on grid 185. The anode current of the triode is no longer sufficient to hold relay 200 in its operative position and motor 111 is deenergized. As previously pointed out operation of the system as it approaches balance is given anti-hunt properties by intermittent energization of motor 111.

From the foregoing it will be apparent that any signal voltage applied to terminals 116 and 117 is at once balanced by an equal voltage from voltage adjuster 113, and that after the balanced condition is attained no further change in the circuit can take place no matter how long the signal applied to terminals 116 and 117 continues. Means are thus provided to make the operation of coupling unit 23, and the voltage supplied by it to the automatic pilot, independent of the length of the interval during which the signal voltage continues.

Movement of slider 233 to the right causes an alternating voltage to appear between conductors 95 and 96, in the input circuit to amplifier 92. The phase of this voltage is the same as that caused by displacement of winding 77 to the left with respect to slider 75, and causes clockwise operation of motor 111 to give right rudder and to move slider 85 to the left until the bridge unbalance voltage is equal to the voltage supplied by a voltage divider 232, when operation of motor 21 is interrupted.

In response to the displacement of rudder 101 the craft begins to turn to the right. This does not cause movement of winding 77 with respect to slider 75, because the initial displacement of slider 233 by motor 111 brings the slider into engagement with contact segment 236, completing the circuit for the directional arm lock, which prevents relative movement between the slider and the winding. The automatic pilot accordingly reaches equilibrium when the input to the amplifier becomes zero, and mere turning of the craft in azimuth is ineffective to change this.

It is a well known that if the rudder of a craft is maintained at a fixed angle to the streamline position, the craft moves in a circle. As soon as the craft starts the circular course, however, it begins to move in space toward the predetermined path, and the voltage between terminals 116 and 117 begins to decrease, so that it has both a "displacement" component linearly proportional to the displacement of the craft from the desired path, and a "rate" component linearly proportional to the speed of the craft normal to the path from which rate of change the rate circuit of the coupler can derive a "rate" voltage component which as previously set forth opposes the displacement voltage component.

This relation is most easily expressed by the equation $$C = K_1 a + K_2 \dot{a}$$

where $K_1$ and $K_2$ are special constants, C is the correction voltage between conductors 245 and 244, $a$ is the angle between TA and the line passing through the transmitter and the craft, and $\dot{a}$ is the rate of change of that angle, and is assigned a positive value when $a$ is changing in a clockwise direction. For one satisfactory arrangement it has been found that $$C = 150a + 3000\dot{a}$$

From the above it follows that although azimuth turning of the craft has no effect, as soon as the craft begins to move toward the selected path the input voltage is reduced by the rate component so that it is less than the voltage supplied by voltage adjuster 113, and a voltage appears between fixed contacts 130 and 131 such as to make the former negative and the latter positive. This voltage is effective through amplifier 136 and discriminator 107 to actuate relay 190, energizing motor 111 to operate, this time in a counterclockwise direction, to reduce the voltage supplied from the voltage adjuster, by moving slider 127 upward, until fixed contacts 130 and 131 are again at the same potential. At the same time motor 111 displaces slider 233 to the left, toward its central position, reducing the voltage supply to the input circuit of amplifier 92 from this source so that the voltage supplied by the unbalance of bridge 88 is now the greater. This impresses upon the amplifier a voltage of the opposite phase to that previously impressed, motor 21 operates in a counterclockwise direction, reducing the amount of right rudder and moving slider 85 back towards its central position. The radius of the circle about which the craft is turning under control of the rudder is thus increased, and this action continues until the craft settles down upon the desired path, whereupon slider 233 engages neither segment 236 nor 237 and the directional arm lock is deenergized, returning azimuth control of the craft to directional gyroscope 15.

In review, the overall function of the apparatus is to correct the heading of the craft to a selected one determined by the directional gyroscope and to override the component performing the above function if the craft is displaced in space from a predetermined path, in such a fashion as to control the craft's heading to bring it back to the path. The detailed operation of the various components correcting for improper heading and improper location of the craft have been minutely recited, for a first sense of each, and the correction in the opposite sense is in every way analogous and will at once be apparent, without detailed explanation, to those skilled in the art. The circuit arrangement described provides means not only for preventing circling at one side of the beam, but also for bringing the craft on the desired path in a nearly dead beat fashion, and further means for preventing any response of the instrument to the length of the interval during which the craft is displaced from the proper path.

The modification of the invention described above is adapted for use with automatic pilots in which the change in the stabilized heading of the craft is brought about by overpowering the directional gyroscope by the directional arm lock, as set forth in detail above. A second modification of the invention, shown in Figure 4 is adapted for use with an automatic pilot having both a stabilizing component and a steering component.

Numerous objects and advantages of my invention have been set forth in the foregoing description, together with details of the structure and function of the invention, and the novel features thereof have been clearly disclosed. The disclosure is illustrative only, and I may make changes in details, especially in matters of shape, size, and arrangement of parts, within the principle of the invention, to the full extent indicated by the broad general meaning of the terms in which the appended claims are expressed.

What is claimed as the invention is:

1. Craft control means comprising, in combination: a source of alternating voltage of a selected frequency; an automatic pilot for a craft including a normally balanced electric network normally energized from said source and having output terminals, attitude responsive means for unbalancing said network to cause an alternating voltage to appear across said output terminals, the sense of said alternating voltage being dependent upon the direction of departure of the craft from a predetermined attitude, and means actuated as a result of said alternating voltage across said output terminals to simultaneously alter the direction of movement of the craft and rebalance said network; a blind landing receiver giving an output voltage whose magnitude and sense are determined by the amount and direction of the displacement of the craft from a predetermined path; and electrical means controlled by said blind landing output voltage for deriving from said voltage source an alternating signal voltage which reverses in sense and varies in magnitude with reversal in the sense and variation in the magnitude of said blind landing output voltage, said network including connections for causing to appear across said output terminals an alternating signal voltage which is related both in magnitude and phase to said alternating voltage derived from said source.

2. Craft control means comprising, in combination: a source of alternating voltage of a selected frequency; an automatic pilot for a craft, including a normally balanced electric network having input terminals normally energized from said source and output terminals which remain deenergized when said network is balanced, attitude responsive means for unbalancing said network, upon departure of the craft from a predeterminde attitude, so as to cause an alternating output voltage from said source to appear between said output terminals, the sense of said output voltage being dependent upon the sense of the departure of the craft from the predetermined attitude, and means actuated by reason of said output voltage to simultaneously rebalance said network and cause change in the attitude of the craft; a blind landing receiver giving a signal voltage whose magnitude is determined by the amount of the displacement of the craft from a predetermined path, and which is of one of two opposite senses according as the displacement of the craft from the path is in one sense or the other; and electrical means controlled by said signal voltage for deriving from said source and causing to appear between said output terminals an alternating voltage whose magnitude varies with the magnitude of said signal voltage, and which is of the same sense as or of the opposite sense to the alternating voltage of said source, according as said signal voltage is of one sense or the other.

3. Means for causing a craft to follow a predetermined path comprising in combination: said craft; control means for governing the attitude of said craft, whereby to determine its direction of movement; motor means for actuating said control means; means for establishing a standard of attitude for said craft; a source of alternating voltage of a selected frequency; normally balanced network means energized from said source, said network means including means normally actuated by departure of said craft from said standard attitude to unbalance said network means and means actuated by the operation of said motor means to rebalance said network means; means connecting said network means to said motor means for energizing the latter, on unbalance of the former, in such a direction as to return said craft to said standard attitude and to rebalance said network; radio transmitting means establishing said predetermined path in terms of a complex electromagnetic radiation pattern; radiation receiving means sensitive to said complex radiations at any point in said pattern, and giving a zero output when said craft is on said path, said receiving means responding to departure of said craft from said path by a unidirectional voltage whose polarity reverses with reversal in the direction of said departure; means deriving from said source, under the control of said unidirectional voltage, an alternating voltage of said selected frequency whose phase reverses with reversal in the polarity of said unidirectional voltage; and means applying said derived alternating voltage to said normally balanced network to independently affect the balance thereof.

4. Means for causing a craft to follow a predetermined path comprising, in combination: a source of alternating voltage; an automatic pilot for controlling the attitude and therefore the direction of movement of a craft in accordance with an alternating voltage from said source; condition responsive means for supplying alternating voltage from said source to said automatic pilot on departure of the craft from a selected attitude; means giving a unidirectional voltage in response to displacement of the craft from a selected path; an independent source of unidirectional voltage; a DC amplifier; a motor; means for energizing said motor under the control of said amplifier in accordance with the input signal thereto; means connecting said unidirectional voltages in opposition to comprise the input to said amplifier; means actuated by said motor for varying the magnitude of the voltage from said independent source so as to reduce said input voltage to zero; and further means actuated by said motor for supplying alternating voltage from said source to said automatic pilot independent of said condition responsive means.

5. Craft control means comprising, in combination: a source of alternating voltage of a selected frequency; an automatic pilot for controlling the attitude of a craft about an axis, including controlled means for causing change in the attitude of the craft about said axis, a normally balanced electric network connected in controlling relation to said controlled means, means normally energizing said network from said source, so that upon unbalance of the network operation of the controlled means takes place, means unbalancing said network upon deviation in the attitude of the craft about said axis from a standard attitude, and means in said network actuable by said control means to rebalance said network; a blind landing system for giving a unidirectional output voltage of reversible polarity and variable magnitude on departure of the craft from a predetermined path in opposite directions and by variable amounts; and means, controlled by said unidirectional voltage, for deriving from said source, and unbalancing said network by, a voltage which is in phase or 180 degrees out of phase with said source according as said unidirectional voltage is of one polarity or the opposite polarity, and which varies in amplitude with variation in the magnitude of said unidirectional voltage, whereby to cause corrective change in the attitude of said craft about said axis.

6. Craft control means comprising, in combination: a source of alternating voltage of a selected frequency; an automatic pilot for a craft including a normally balanced electric network normally energized from said source, means unbalancing said network in accordance with the heading of the craft, and means actuated upon unbalance of said network to simultaneously alter the direction of movement of the craft and rebalance said network; a blind landing receiver giving a unidirectional output voltage whose magnitude and polarity are determined by the amount and direction of the displacement of the craft from a predetermined path; and electrical means controlled by said unidirectional voltage for disabling said unbalancing means and independently unbalancing said network with an alternating signal voltage, derived from said source, which reverses in phase and varies in amplitude with reversal in the polarity and variation in the magnitude of said unidirectional output voltage.

7. Control apparatus for a craft having at least one attitude control surface, comprising, in combination: a source of alternating voltage of a selected frequency; normally balanced control means effective upon unbalance in opposite senses to supply from said source an alternating output voltage of one of two opposite phases; means for unbalancing said control means in accordance with error in an attitude of the craft; reversible means effective, upon energization with alternating voltage of one of said two opposite phases, to rebalance said control means and simultaneously to adjust a control surface of a craft to cause change in the direction of movement of the craft; means energizing said last named means with said alternating output voltage; means responsive to departure of the craft from a predetermined path; means actuated in accordance with the magnitude and sense of the response of said responsive means to supply a further voltage from said source of variable amplitude and of one of said two opposite phases; and means combining said further voltage with said output voltage to cause the craft to move toward the path.

8. Control apparatus for a craft having at least one attitude control surface, comprising, in combination: a source of alternating voltage of a selected frequency; normally balanced control means effective upon unbalance in opposite senses to supply from said source an alternating output voltage of one of two opposite phases; means for unbalancing said control means in accordance with departure of a craft from a desired heading; reversible means effective, upon energization with alternating voltage of one of two opposite phases, to rebalance said control means and simultaneously to adjust a control surface of the craft to cause change in the direction of movement of the craft; means energizing said last named means with said alternating output voltage; means responsive to departure of the craft from a predetermined path; means actuated in accordance with the magnitude and sense of the response of said responsive means to supply a further voltage from said source of variable amplitude and of one of said two opposite phases; and means combining said further voltage with said output voltage to cause the craft to move toward the path.

9. Control apparatus for a craft having at least one attitude control surface, comprising, in combination: a source of alternating voltage of a selected frequency; normally balanced control means effective upon unbalance in opposite senses to supply from said source an alternating output voltage of one of two opposite phases; means for unbalancing said control means in accordance with departure of the craft from a predetermined attitude; reversible means effective, upon energization with alternating voltage of one of said two opposite phases, to rebalance said control means and simultaneously to adjust a control surface of a craft to cause change in the attitude and hence in the direction of movement of the craft; means energizing said last named means with said alternating output voltage; means giving a unidirectional output voltage which varies in magnitude and polarity with the amount and sense of the departure of the craft from a predetermined path; means actuated in accordance with the magnitude and polarity of said unidirectional voltage to supply a further voltage, from said source, of variable amplitude and of one of said two opposite phases; and means combining said further voltage with said output voltage to cause the craft to move toward the path.

10. Craft control means comprising, in combination: a source of alternating voltage of a selected frequency; an automatic pilot for a craft including a normally balanced electric network normally energized from said source, attitude responsive means for unbalancing said network to supply a first alternating output voltage, the sense of said alternating voltage being dependent upon the direction of departure of the craft from a predetermined attitude, and control means actuated as a result of the alternating voltage so supplied to simultaneously alter the direction of movement of the craft and rebalance said network; a blind landing receiver giving an output voltage whose magnitude and sense are determined by the amount and direction of the displacement of the craft from a predetermined path; electrical means controlled by said blind landing signal voltage for deriving from said voltage source a second alternating output voltage which reverses in sense and varies in magnitude with reversal of the sense and variation in the magnitude of said blind landing signal voltage; and means further actuating said control means in accordance with said second alternating voltage.

11. Craft control means comprising, in combination: a source of alternating voltage of a selected frequency; an automatic pilot for a craft, including a normally balanced electric network normally energized from said source, attitude responsive means for unbalancing said network, upon departure of the craft from a predetermined attitude, so as to supply a first alternating output voltage from said source, the sense of said output voltage being dependent upon the sense of the departure of the craft from the predetermined attitude, and means actuated by reason of said output voltage to simultaneously rebalance said network and cause change in the attitude of the craft; a blind landing receiver giving a signal voltage whose magnitude is determined by the amount of the displacement of the craft from a predetermined path, and which is of one of two opposite senses according as the displacement of the craft from the path is in one sense or the other; and electrical means controlled by said signal voltage for deriving from said source, and modifying said output voltage in accordance with, a second alternating voltage output which varies in magnitude with the magnitude of said signal voltage, and which is of the same sense as or of the opposite sense to the alternating voltage of said source, according as said signal voltage is of one sense or the other.

12. Craft control means comprising, in combination: a source of alternating voltage; first connecting means supplying from said source a first voltage which varies in amplitude with the amount of departure of a movable craft from a selected attitude, and which reverses in phase with reversal in the sense of said departure, and second connecting means supplying from said source a second voltage which varies in amplitude with the amount of deviation of a movable craft from a selected path, and which reverses in phase with reversal in the sense of said deviation, said connecting means having constant phase shift effects of such relative magnitude that the phase angle between said first voltage and said second voltage is substantially either zero degrees or 180 degrees depending on the senses of said deviation and said departure; means adding said voltages algebraically; and means actuating a control surface of the craft in accordance with the sum of said voltages.

13. Craft control means comprising, in combination: a source of alternating voltage; first connecting means supplying from said source a first voltage which varies in amplitude with the amount of departure of a movable craft from a selected attitude and which reverses in phase with reversal in the sense of said departure, and second connecting means supplying from said source a second voltage which varies in amplitude with the amount of departure of the craft from a selected path, and which reverses in phase with reversal in the sense of said deviation, said connecting means having constant phase shift effects of such relative magnitude that the phase angle between said first voltage and said second voltage is substantially either zero degrees or 180 degrees depending on the senses of said deviation and said departure; means adding said voltages algebraically; motor means for adjusting a control surface of the craft; and means causing operation of said motor means in a first direction when the sum of said voltages is of a first phase and in the opposite direction when said sum is of the opposite phase.

WALTER T. FISHER,
*Executor of the estate of Benjamin Carpenter, deceased.*

REFERENCES CITED

The following references are of record in the file of this patent:

UNITED STATES PATENTS

| Number | Name | Date |
|---|---|---|
| 2,390,793 | Jones | Dec. 11, 1945 |
| 2,419,970 | Roe et al. | May 6, 1947 |
| 2,423,337 | Moseley | July 1, 1947 |
| 2,454,401 | Nygaard | Nov. 23, 1948 |